United States Patent Office 3,067,418
Patented Dec. 4, 1962

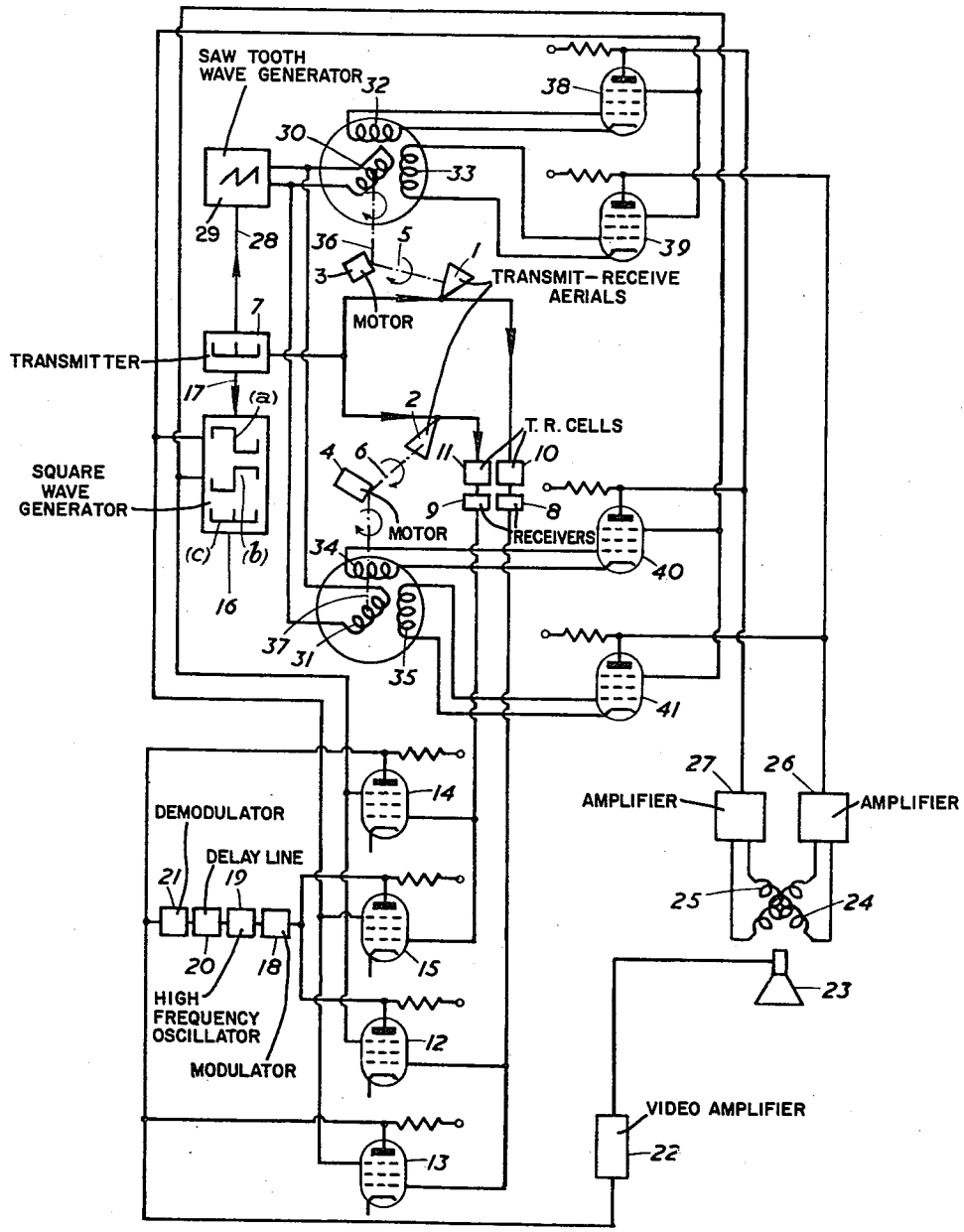

3,067,418
PULSED RADAR SYSTEMS
Gordon Nimmo Coop, Little Baddow, England, assignor to Marconi's Wireless Telegraph Company Limited, London, England, a company of Great Britain
Filed July 14, 1958, Ser. No. 748,393
Claims priority, application Great Britain Aug. 26, 1957
6 Claims. (Cl. 343—11)

This invention relates to pulsed radar systems and more specifically to pulsed radar systems of the kind employing a plurality of differently directed simultaneously transmitted scanning pulsed radio beams.

There are a number of pulsed radar systems of the kind referred to. For example, in order to provide a radar system with a high data rate and which will ensure that each target will be struck a large number of times by a scanning beam of given width and pulsed at a given pulse repetition frequency, it has been proposed to use a number of scanning beams pointed in different directions—usually two beams at 180° to one another—and pulsed simultaneously, there being two receivers, one for each beam. Since, however, if maximum data rate is to be obtained, the pulse repetition frequency must approximate to the reciprocal of the effective propagation time for a target at the longest range the system is designed to handle, the signals from the receivers cannot simply be combined and fed to a common display tube with an azimuth deflection of 360° and, in the case of a system using two transmitted beams at 180° and employing a PPI type of display, the display tube has to be limited to a display of 180° in azimuth as respects each receiver. Another example of a system of the kind referred to and in which the same sort of difficulty arises, is that in which a single aerial reflector is fed by two linear arrays operated at different frequencies and positioned to give optimum vertical coverage over different ranges. Here again the two linear arrays will, except for certain critical conditions, produce differently directed beams from the reflector and the video outputs of two receivers, one for each beam, again cannot be directly mixed for display.

The invention seeks to overcome the above mentioned difficulties and to provide improved radar systems of the kind referred to in which a high data rate and a high number of "strikes per target" for a given transmitted beam width and a given pulse repetition frequency can be obtained without discarding any informaton data.

According to this invention in its broadest aspect a pulsed radar system of the kind employing a plurality of differently directed, simultaneously pulsed, transmitted scanning radio beams comprises means for transmitting the differently directed beams and pulsing the same at the same pulse repetition frequency; a plurality of receivers, one for each of said beams, and adapted and arranged to produce simultaneously occurring video signals at the pulse repetition frequency from echo signals produced by the different beams; a set of signal channels associated with each receiver and each consisting of as many channels as there are different beams; means for connecting the channels of each set, in turn and for successive pulse repetition periods, to receive video signals from the receiver with which said set is associated; means for differently delaying the signals in each channel by amounts such that, at the outputs of all the channels of a set, the successively occurring periods of connection to the appropriate receiver are differently delayed so as to occur simultaneously; means for combining the outputs from all the channels of all the sets; and means for displaying the combined outputs.

According to a feature of the invention a radar system comprises means for transmitting two scanning directional radio beams in different directions and pulsing the same at the same pulse repetition frequency; a pair of video signal producing receivers, one for each beam, and adapted and arranged to produce simultaneously occurring video signals at the pulse repetition frequency from echo signals produced by the two beams; a set of two signal channels associated with each receiver; means for feeding signals from each receiver alternatively and for successive pulse repetition periods to the channels of the set of channels associated therewith; means for introducing between the delay times of the two channels of each set, a difference delay time equal to a transmitted pulse period; means for combining the outputs from all the channels of all the sets; and means for displaying the combined outputs.

Preferably the two channels of each set are fed from the associated receiver through gated valves which are opened alternately, and for successive pulse repetition periods, by a control wave synchronized at the pulse repetition frequency.

A preferred embodiment of the invention, giving a PPI display, includes means for generating a deflecting saw tooth wave of pulse repetition period, means for resolving said wave into two components respectively representative of the co-ordinate components of the instantaneous direction of one transmitted beam, means for resolving said wave into two further components respectively representative of the co-ordinate components of the instantaneous direction of the other transmitted beam, and means, synchronized at the pulse repetition frequency, for alternately and for successive pulse repetition periods, feeding the first mentioned components and the further components to co-ordinate deflection means of a PPI display cathode ray tube, the periods in which the first mentioned components are fed to said deflection means coinciding with periods in which echo signals due to said one transmitted beams are fed to said tube to modulate the ray therein.

In the simplest and preferred embodiment of the invention the differently directed transmitted beams are pulsed simultaneously but the same overall result may be obtained by pulsing them at the same pulse repetition frequency but at different times and differently delaying the echo signals produced by the different beams so that simultaneously occurring video signals, repeated at the pulse repetition frequency, are produced by the receivers.

The invention is illustrated in the accompanying drawing which shows in simplified diagrammatic form one embodiment of the invention.

Referring to the drawing a radar system of the kind referred to comprises two transmit-receive aerials 1, 2, represented simply as horns and which are rotated in azimuth in the usual way. In the simplest case these two aerials will provide sharp transmitted beams pointing in opposite directions and rotated together at a predetermined speed of rotation by a common electric motor. As, however, it is not necessary to the invention that the two aerials be on a common mount or even that they rotate in synchronism, the more general case is illustrated and the aerials 1 and 2 are represented as rotated in azimuth by electric motors 3 and 4 respectively, mechanical drives being indicated by the chain lines 5 and 6. In the embodiment shown a pulsed transmitter 7 which is pulsed at a predetermined pulse repetition frequency chosen in dependence upon the maximum range to be accommodated by the system, feeds both aerials. Each aerial feeds its own receiver 8 or 9. The blocks 10 and 11 represent suitable T-R cell arrangements for protecting the receivers 8 and 9 from transmitted pulses in the usual way. Output from the receiver 8 is fed in parallel to the control grids of two gated valves 12 and 13 which are controlled by a gating waveform supplied to their suppressor grids and the output from the receiver 9 is fed to similar gated valves 14 and 15 similarly controlled by a gating waveform.

The control gating waveforms are derived from a square wave generator 16 producing two square waves in 180° phase relation as indicated. The periodicity of each of these square waves is twice the pulse repetition period so that, considering each of these square waves separately, a transmitted pulse occurs at the beginning and end of each negative going half wave and at the beginning and end of each positive going half wave. The two square waves are represented on the block 16 at *a* and *b* and the occurrence of the transmitted pulses at *c*. The square wave generator is synchronized by the transmitter 7 in any convenient way as indicated by the lead 17.

The control of the gated valves 12, 13, 14, 15 is such that the valves 12 and 14 are "opened" together and the valves 13 and 15 "closed" together during one transmitted pulse period and, during the next transmitted pulse period, the valves 13 and 15 are "opened" and the valves 12 and 14 "closed." The outputs from the valves 12 and 15 are combined and subjected to a time delay equal to one pulse repetition period. As shown these outputs are fed to a modulator 18 which modulates a high frequency oscillator 19, for example, to quote a practical figure, an oscillator of 8 mc./s. The modulated output from this oscillator is subjected to the required delay by a mercury or other convenient delay line 20, the output from which is in turn demodulated by a demodulator 21. The required delay may be obtained in any other convenient way, but the illustrated arrangement in which a modulated oscillation is delayed and then demodulated is convenient since delaying a modulated high frequency is simpler, from the point of view of design of the delay line, than delaying the original signal.

The delayed output from the demodulator 21 is combined with the undelayed outputs from the valves 13 and 14 and fed to a common video amplifier 22 which modulates the cathode ray in a PPI cathode ray display tube schematically indicated at 23. The ray in this tube is subjected to deflection for PPI display by means of a fixed electrical deflection system represented by mutually perpendicular coils 24 and 25 fed from amplifiers 26 and 27 respectively. Also synchronized with the transmitter 7, as indicated by the lead 28, is a saw tooth wave generator 29 which provides the necessary deflection and feeds its saw tooth output to the rotor coils 30 and 31 of two resolvers adapted to produce co-ordinate component electrical outputs in manner well known per se. As indicated one resolver comprises the rotating coil 30 and the mutually perpendicular coils 32 and 33, while the other resolver comprises the rotating coil 31 and the mutually perpendicular coils 34 and 35. The rotating coil 30 is rotated in any convenient manner in synchronism with the aerial 1 as indicated by the chain line 36 and the rotating coil 31 is similarly rotated in synchronism with the aerial 2 as indicated by the chain line 37.

Outputs from the coils 32, 33, 34 and 35 are fed to the control grids of gated valves 38, 39, 40 and 41 which are gated in the same manner as the gated valves already referred to by the two wave forms from the square wave generator 16, so that the valves 38, 39, 13 and 15 "open" and "close" together, while the valves 40, 41, 12 and 14 "open" and "close" together. The outputs from the valves 38 and 40 are combined and fed to the amplifier 27 while the outputs from the valves 39 and 41 are combined and fed to the amplifier 26. As will be seen the whole arrangement is such that the co-ordinate deflection forces fed to the deflection system 24—25 correspond to the movement of the aerial 1 during alternate transmitted pulse periods in which the video signals displayed by that tube are derived from the receiver 8, while the said deflection forces correspond to the movement of the aerial 2 during the remaining alternate transmitted pulse periods in which the signals displayed are derived from the receiver 9. In this way there is full display without discarding any information data.

If the aerials 1 and 2 are back to back and rotate synchronously so that the beams point in opposite directions, alternate range scans in the display tube will be 180° displaced in azimuth and the display will resemble that obtained with a double beam display tube.

It is not necessary for all the signals from both receivers to be displayed and, if required, signals from receiver 8 and corresponding to targets within one predetermined zone of ranges may be selected for display and signals from receiver 9 and corresponding to targets in another predetermined zone of ranges may be selected for display. This may be done by inserting individually controllable range-zone gates as known per se between receiver 8 and valves 12 and 13 on the one hand and between receiver 9 and valves 14 and 15 on the other. Such range-zone gates are not shown since they are, as stated, known per se and therefore require no further description here.

I claim:

1. A pulsed radar system comprising means for transmitting two scanning directional radio beams in different directions; means for pulsing the same at the same pulse repetition frequency; a pair of video signal producing receivers, one for each beam; a set of two signal channels associated with each receiver; means for feeding signals from each receiver alternately and for successive pulse repetition periods to the channels of the set of channels associated therewith; means for delaying the signals in one of the two channels of each set with respect to the signals in the other of the two channels by a time equal to a transmitted pulse repetition period; means for combining the outputs of one channel of each set, said last mentioned means also combining the outputs of the other channel of each set; and means for displaying the combined outputs of all of said channels.

2. A pulsed radar system as set forth in claim 1 wherein the two channels of each set are fed from the associated receiver through gated valves; said system further including means for generating a control wave synchronized at the pulse repetition frequency and means, responsive to said control wave, for opening said gated valves alternately for successive pulse repetition periods.

3. A pulsed radar system as set forth in claim 1 and including means for generating a deflecting saw tooth wave of pulse repetition period, means for resolving said wave into two components respectively representative of the co-ordinate components of the instantaneous direction of one transmitted beam, means for resolving said wave into two further components respectively representative of the co-ordinate components of the instantaneous direction of the other transmitted beam, P.P.I. display tube having co-ordinate deflection means and means, synchronized at the pulse repetition frequency, for alternately and for successive pulse repetition periods, feeding the first mentioned components and the further components to said co-ordinate deflection means of the PPI display cathode ray tube, the periods in which the first mentioned components are fed to said deflection means coinciding with periods in which echo signals due to said one transmitted beam are fed to said tube to modulate the ray therein.

4. A pulsed radar system as set forth in claim 1 wherein the differently directed transmitted beams are pulsed simultaneously.

5. A pulsed radar system as set forth in claim 1, wherein said means for pulsing said transmitting means includes means for pulsing said transmitted beam at the same pulse repetition rate but at different times.

6. A pulsed radar system of the kind employing a plurality of differently directed, transmitted scanning radio beams; said system comprising means for transmitting the differently directed beams; means for pulsing the same at the same pulse repetition frequency; a plurality of receivers, one for each of said beams; a set of signals channels associated with each receiver and each comprising as many channels as there are different beams; means for connecting the channels of each set, in turn and for successive pulse repetition periods for receiving video signals from the receiver with which said set is associated; means for differently delaying the signals in the different channels of each set to produce simultaneously at the outputs of all the channels of a set, signals resulting from those received by the appropriate receiver at corresponding times during successively occurring pulse repetition periods; means for combining the outputs of one channel of each set, said last mentioned means also combining the outputs of the other channel of each set; and means for displaying the combined outputs of all of said channels.

References Cited in the file of this patent

UNITED STATES PATENTS 2,627,068     Huber _____ Jan. 27, 1953